US012466581B2

(12) United States Patent
Toon et al.

(10) Patent No.: US 12,466,581 B2
(45) Date of Patent: Nov. 11, 2025

(54) CHOCK FOR STEERING MECHANISM OF AN AIRCRAFT NOSE LANDING GEAR

(71) Applicant: The Boeing Company, Arlington, VA (US)

(72) Inventors: Nicholas Toon, Kirkland, WA (US); Lance Joseph Bakken, Mukilteo, WA (US); Andrew Henry Adams, Shoreline, WA (US); Brian A. Harr, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 386 days.

(21) Appl. No.: 18/313,571

(22) Filed: May 8, 2023

(65) Prior Publication Data

US 2024/0375787 A1    Nov. 14, 2024

(51) Int. Cl.
*B64F 1/16*    (2006.01)
(52) U.S. Cl.
CPC ...................... *B64F 1/16* (2013.01)
(58) Field of Classification Search
CPC . B64F 1/16; B64C 25/50; B64C 25/26; B64C 25/34
USPC ......................................................... 188/131
See application file for complete search history.

(56) References Cited

U.S. PATENT DOCUMENTS

| 2,930,547 | A | * | 3/1960 | Hogan | B64C 25/50 |
| | | | | | 244/50 |
| 4,265,417 | A | * | 5/1981 | Watts | B64C 25/505 |
| | | | | | 244/50 |
| 4,389,029 | A | * | 6/1983 | Glasenapp | B64C 25/32 |
| | | | | | 280/157 |
| 4,462,560 | A | * | 7/1984 | Earl | B64F 1/10 |
| | | | | | 244/110 E |
| 5,242,131 | A | * | 9/1993 | Watts | B64C 25/34 |
| | | | | | 244/50 |
| 5,655,631 | A | * | 8/1997 | Richardson | B60T 3/00 |
| | | | | | 188/32 |
| 6,016,995 | A | * | 1/2000 | Squires | B64C 25/00 |
| | | | | | 244/102 R |

(Continued)

OTHER PUBLICATIONS

Uline, "Aircraft Wheel Chocks—10×5×4 ½", Retrieved from the internet: URL: https://www.uline.com/Product/Detail/H-4196/Wheel-Chocks/Aircraft-Wheel-Chocks-10-x-5-x-4-1-2?pricode=WA9683 &gadtype=pla&id=H-4196&gclid=%E2%80%A61/1Home [retrieved on May 8, 2023], p. 1.

(Continued)

*Primary Examiner* — Henry Y Liu
(74) *Attorney, Agent, or Firm* — COATS & BENNETT, PLLC

(57) ABSTRACT

A device to engage with a steering mechanism of a nose landing gear of an aircraft to limit steering rotation of the nose landing gear. The device includes a first chock sized to fit within a first space formed in the nose landing gear at a first cylinder of a steering mechanism, and a second chock sized to fit within a second space formed in the nose landing gear at a second cylinder. The first chock is configured to engage with the first cylinder and to compress to prevent retraction of the first cylinder beyond a first predetermined length. The second chock is configured to engage with the second cylinder and to compress to prevent retraction of the second cylinder beyond a second predetermined length.

20 Claims, 13 Drawing Sheets

(56) References Cited

U.S. PATENT DOCUMENTS

| | | | | |
|---|---|---|---|---|
| 6,896,223 | B2* | 5/2005 | Fulcher | B64F 1/16 70/228 |
| 7,040,573 | B2* | 5/2006 | Selman | B64C 35/00 244/101 |
| 7,121,508 | B2* | 10/2006 | Fulcher | B64F 1/16 70/228 |
| 7,944,372 | B2* | 5/2011 | Gouette | G01M 1/125 340/960 |
| 8,074,775 | B2* | 12/2011 | Arnold | B60T 3/00 188/32 |
| 8,998,129 | B2* | 4/2015 | Bennett | B64C 25/34 244/50 |
| 9,162,756 | B2* | 10/2015 | Menezes | B64C 25/34 |
| 9,696,148 | B2* | 7/2017 | Crow, Jr. | B64F 5/60 |
| 9,802,697 | B2* | 10/2017 | Liegeois | B64C 25/505 |
| 9,868,518 | B2* | 1/2018 | Elliott | B64C 25/34 |
| 9,988,144 | B2* | 6/2018 | Perkins | B64C 25/50 |
| 10,065,729 | B2* | 9/2018 | Howell | B64C 25/50 |
| 10,308,351 | B2* | 6/2019 | Thompson | B64C 25/34 |
| 11,530,051 | B2* | 12/2022 | Daneshvaran | B64C 25/001 |
| 11,541,855 | B2* | 1/2023 | Dubacher | F16D 23/12 |
| 2004/0113015 | A1* | 6/2004 | Fulcher | B64F 1/16 244/111 |
| 2005/0178902 | A1* | 8/2005 | Fulcher | B64F 1/16 244/114 R |
| 2006/0016933 | A1* | 1/2006 | Selman | B64C 35/008 244/101 |
| 2008/0185238 | A1* | 8/2008 | Arnold | B60T 3/00 188/32 |
| 2009/0040072 | A1* | 2/2009 | Read | B64F 1/22 340/960 |
| 2009/0078821 | A1* | 3/2009 | Chow | B64C 25/16 244/1 N |
| 2010/0078517 | A1* | 4/2010 | Coles | B64C 25/34 244/50 |
| 2012/0318909 | A1* | 12/2012 | Bennett | B64C 25/34 244/50 |
| 2013/0020431 | A1* | 1/2013 | Bennett | B64C 25/48 244/50 |
| 2013/0146704 | A1* | 6/2013 | Menezes | B64C 25/34 244/50 |
| 2013/0264414 | A1* | 10/2013 | Ribarov | B64C 25/50 244/50 |
| 2014/0061372 | A1* | 3/2014 | Briancourt | B64C 25/50 244/50 |
| 2014/0210647 | A1* | 7/2014 | Ataman | H01H 3/16 340/960 |
| 2014/0239119 | A1* | 8/2014 | Martin | B64C 25/50 244/50 |
| 2014/0239120 | A1* | 8/2014 | Martin | B64C 25/50 244/50 |
| 2016/0052623 | A1* | 2/2016 | Elliott | B64C 25/18 244/102 R |
| 2016/0101849 | A1* | 4/2016 | Liegeois | B64C 25/34 244/50 |
| 2016/0167772 | A1* | 6/2016 | Howell | B64C 25/405 244/50 |
| 2016/0272307 | A1* | 9/2016 | Perkins | B64C 25/10 |
| 2016/0347445 | A1* | 12/2016 | Thompson | B64C 25/34 |
| 2019/0337496 | A1* | 11/2019 | Dubacher | F16D 11/16 |
| 2023/0264811 | A1* | 8/2023 | Reber | B64C 25/50 244/50 |

OTHER PUBLICATIONS

Ame Intl., "Aerochock 20, Small/Medium—Ame Intl", Retrieved from the internet: URL: https://ameintl.net/products/15372/ [retrieved on May 8, 2023], pp. 1-4.

* cited by examiner

CHOCK FOR STEERING MECHANISM OF AN AIRCRAFT NOSE LANDING GEAR

TECHNOLOGICAL FIELD

The present disclosure relates generally to the field of aircraft and, more specifically, to chocks that engage with the steering mechanism of nose landing gear of an aircraft to prevent castering of the wheels of the nose landing gear.

BACKGROUND

Many aircraft include a nose landing gear located in a forward section. A primary function of the nose landing gear is to support the aircraft on the ground, such as during landing, takeoffs, and while taxiing. The nose landing gear includes a steering mechanism configured to rotate the nose landing gear to steer the aircraft on the ground.

When the aircraft is parked, high lateral winds can cause the nose landing gear to turn (i.e., caster). This castering movement in combination with the wind forces can cause the aircraft to move across the tarmac and collide with other aircraft or structures and be damaged.

To prevent the aircraft from moving on the tarmac while parked, chocks are positioned against the wheels of the nose landing gear. The chocks have a wedge shape with a bottom surface that contacts against the tarmac and an angled upper surface that contacts against the wheel. In use, two chocks are often used and placed against the front and back sides of the tires. However, the chocks are not designed to prevent castering. Wind force applied to the aircraft can cause castering of the nose landing gear even when the tires are chocked.

To prevent castering, some applications have used chocks in non-typical manners. Other solutions have tried to design chocks with various shapes and/or sizes. One example includes tying chocks together in the front and back sides of the tires in an attempt to make them more effective. In other examples sandbags are used as chocks. However, these attempts are unsafe and/or ineffective in preventing castering.

SUMMARY

One aspect is directed to a device to engage with a steering mechanism of a nose landing gear of an aircraft to limit steering rotation of the nose landing gear. The device comprises a first chock sized to fit within a first space formed in the nose landing gear at a first cylinder of a steering mechanism of the nose landing gear. A second chock is sized to fit within a second space formed in the nose landing gear at a second cylinder of the steering mechanism. The first chock is configured to engage with the first cylinder and to compress to prevent retraction of the first cylinder beyond a first predetermined length. The second chock is configured to engage with the second cylinder and to compress to prevent retraction of the second cylinder beyond a second predetermined length.

In another aspect, the first chock and the second chock are separate members that configured to be spaced apart by a gap when engaged respectively with the first cylinder and the second cylinder.

In another aspect, the device further comprises an elongated flexible connector with a first end connected to the first chock and a second end connected to the second chock.

In another aspect, the first chock and the second chock comprise mirrored shapes.

In another aspect, the first chock and the second chock comprise a single, unitary member with the member comprising an intermediate section sized to extend across a gap formed between the first cylinder and the second cylinder.

One aspect is directed to a device to engage with a steering mechanism of a nose landing gear of an aircraft to limit steering rotation of the nose landing gear. The device comprises a first chock sized to fit within a first space at a first section of a steering mechanism of the nose landing gear. A second chock is sized to fit within a second space at a second section of the steering mechanism of the nose landing gear. The first chock and the second chock each comprise: a front contact side; a back contact side that opposes the front contact side; a bottom side; and a top side that opposes the bottom side. The first chock is sized to fit within the first space and to compress when the steering mechanism turns the nose landing gear in a first direction. The second chock is sized to fit within the second space and to compress when the steering mechanism turns the nose landing gear in a second direction.

In another aspect, the first chock and the second chock are separate members.

In another aspect, the device further comprises an elongated flexible connector with a first end connected to the first chock and a second end connected to the second chock.

In another aspect, the first chock and the second chock comprise a single, unitary member with the member comprising an intermediate section sized to extend across a gap formed between the first section and the second section of the steering mechanism.

In another aspect, the first chock comprises a central slot that extends through the first chock between the front contact side and the back contact side, and the first chock further comprises an opening that extends into the central slot along a lateral side of the first chock.

One aspect is directed to a method of limiting steering rotation of a nose landing gear of an aircraft. The method comprises inserting a first chock in a first space formed between a first cylinder and the nose landing gear, and inserting a second chock in a second space formed between a second cylinder and the nose landing gear. The first chock is configured to compress and limit the steering rotation of the nose landing gear in a first direction. The second chock is configured to compress and limit the steering rotation of the nose landing gear in the second direction.

In another aspect, the method further comprises: turning the nose landing gear in the first direction and compressing the first chock and limiting the steering rotation of the nose landing gear in the first direction; and turning the nose landing gear in the second direction and compressing the second chock and limiting the steering rotation of the nose landing gear in the second direction.

In another aspect, the method further comprises maintaining the first chock connected with a connector to the second chock while turning the nose landing gear in the first direction and the second direction.

In another aspect, the method further comprises turning the nose landing gear in the first direction and increasing a size of the second space while concurrently compressing the first chock.

In another aspect, the method further comprises inserting the first chock underneath a first arm that extends outward from the first cylinder and inserting the second chock 20*b* underneath a second arm that extends outward from the second cylinder.

In another aspect, the method further comprises: in response to turning the nose landing gear in the first direction, compressing the first chock and preventing a steering angle of the nose landing gear from turning beyond a first predetermined amount in the first direction; and in response to turning the nose landing gear in the second direction, compressing the second chock and preventing the steering angle of the nose landing gear from turning beyond a second predetermined amount in the second direction.

In another aspect, the method further comprises attaching the first chock to a first arm that extends outward from the first cylinder and attaching the second chock to a second arm that extends outward from the second cylinder.

In another aspect, the method further comprises spacing the first chock away from the second chock.

In another aspect, the method further comprises the first chock and the second chock being a single unitary member and compressing the first chock when turning the nose landing gear in the first direction without compressing an intermediate section that extends between the first chock 20a and the second chock and turning the nose landing gear in the second direction without compressing the intermediate section.

In another aspect, the method further comprises inserting the first chock in the first space and the second chock in the second space when the nose landing gear is at a 0° steering angle.

The features, functions and advantages that have been discussed can be achieved independently in various aspects or may be combined in yet other aspects, further details of which can be seen with reference to the following description and the drawings.

DETAILED DESCRIPTION

Figure 1:
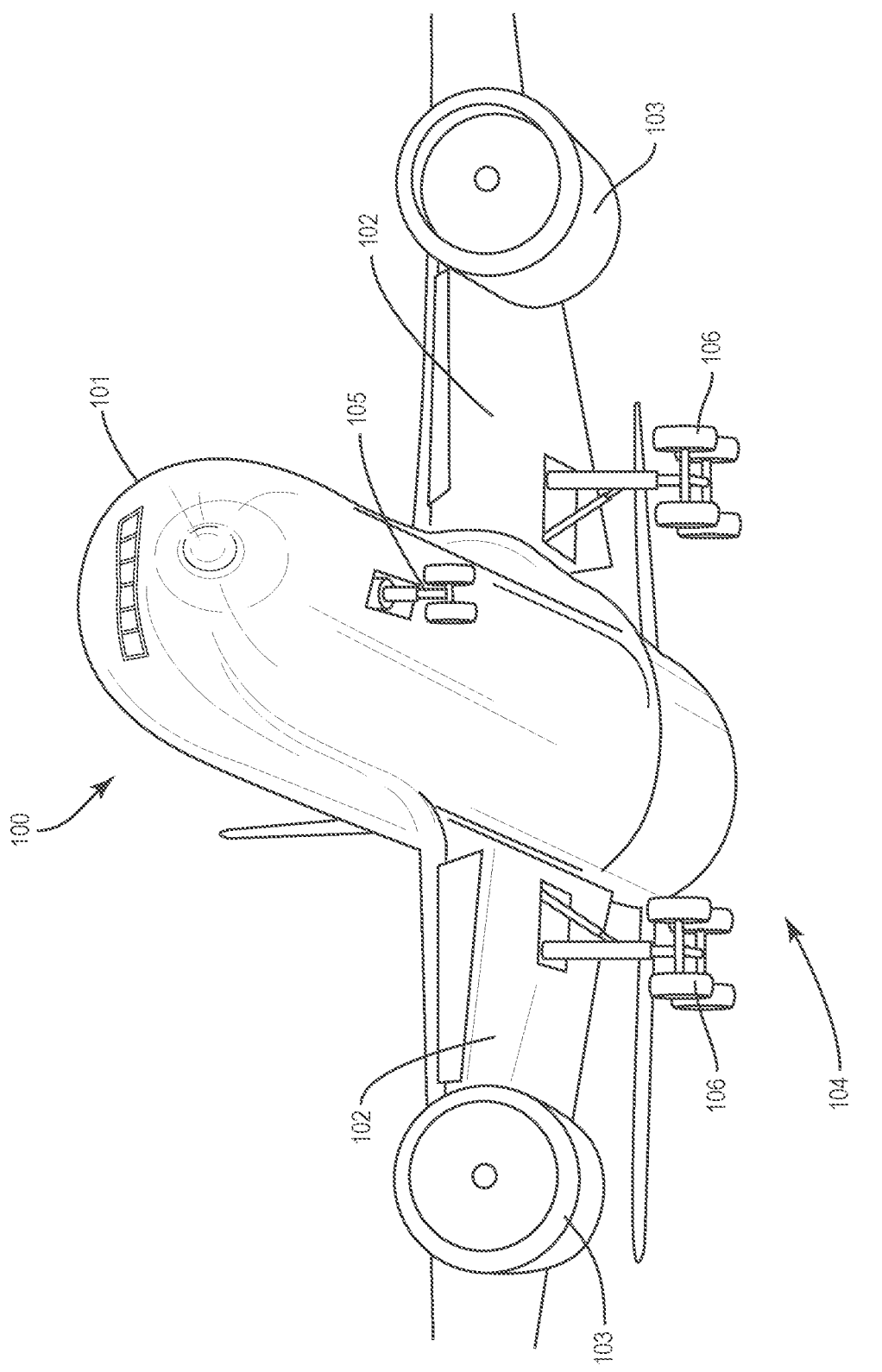
FIG. 1 is a perspective view of an aircraft with the landing gear extended outward from the fuselage.

FIG. 1 illustrates an aircraft 100 that includes a fuselage 101, wings 102, and engines 103. Landing gear 104 is positioned on the bottom of the fuselage 101 and/or wings 102. The landing gear 104 includes nose landing gear 105 at a forward section of the fuselage 101, and aft landing gear 106 at the fuselage 101 and/or wings 102. The landing gear 104 is retractable to be extended during takeoffs, landings, and while on the ground, and to be retracted into the fuselage 101 and/or wings 102 during flight. In addition to supporting the aircraft 100 while on the ground, the nose landing gear 105 also includes a steering mechanism that rotates to steer the aircraft 100 when moving on the ground. The landing gear 104 is controlled through commands input from flight personnel positioned on the flight deck.

Figure 2:
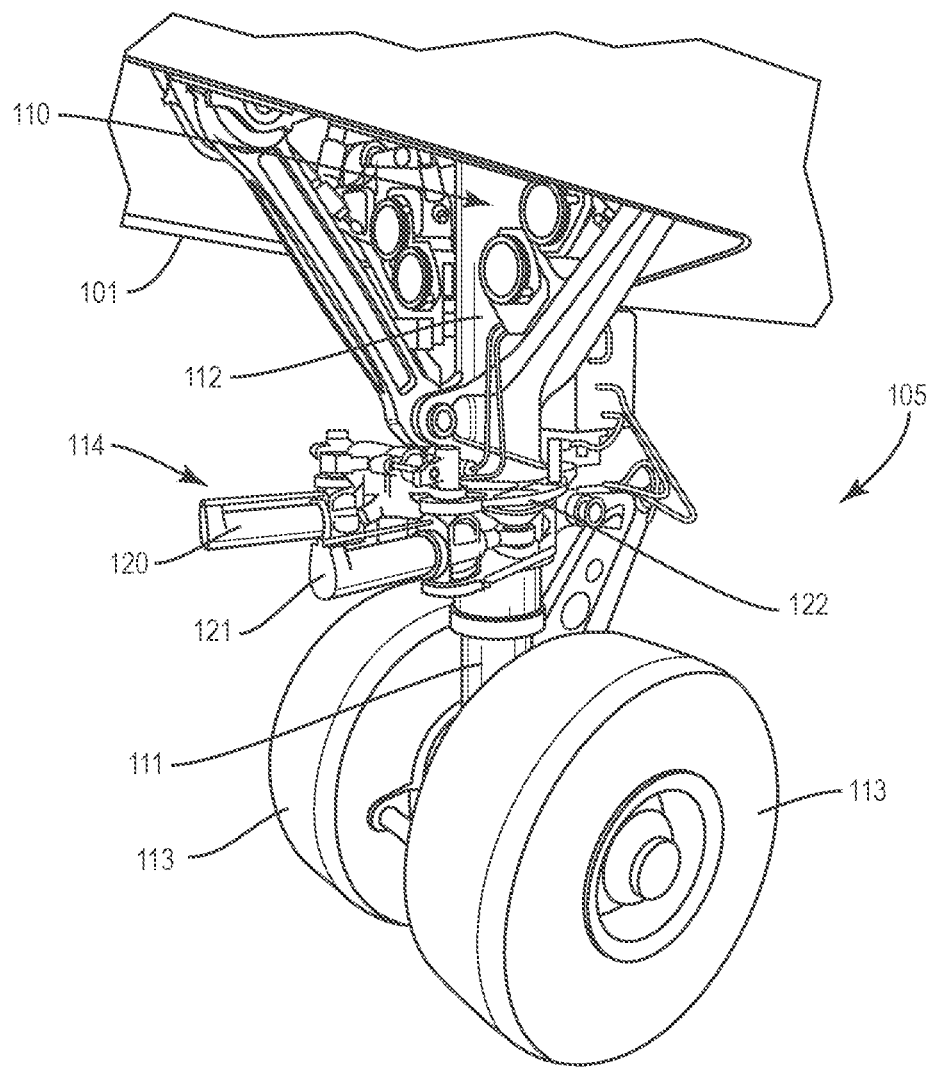
FIG. 2 is a perspective view of the nose landing gear of an aircraft.

FIG. 2 illustrates the nose landing gear 105 in an extended position outward from the bottom of the fuselage 101. The nose landing gear 105 includes a shock absorber 110 with telescoping lower and upper struts 111, 112. Wheels 113 are mounted to the lower strut 111. The lower strut 111 and wheels 113 are rotatable relative to the upper strut 112 through a steering mechanism 114.

Figure 3:
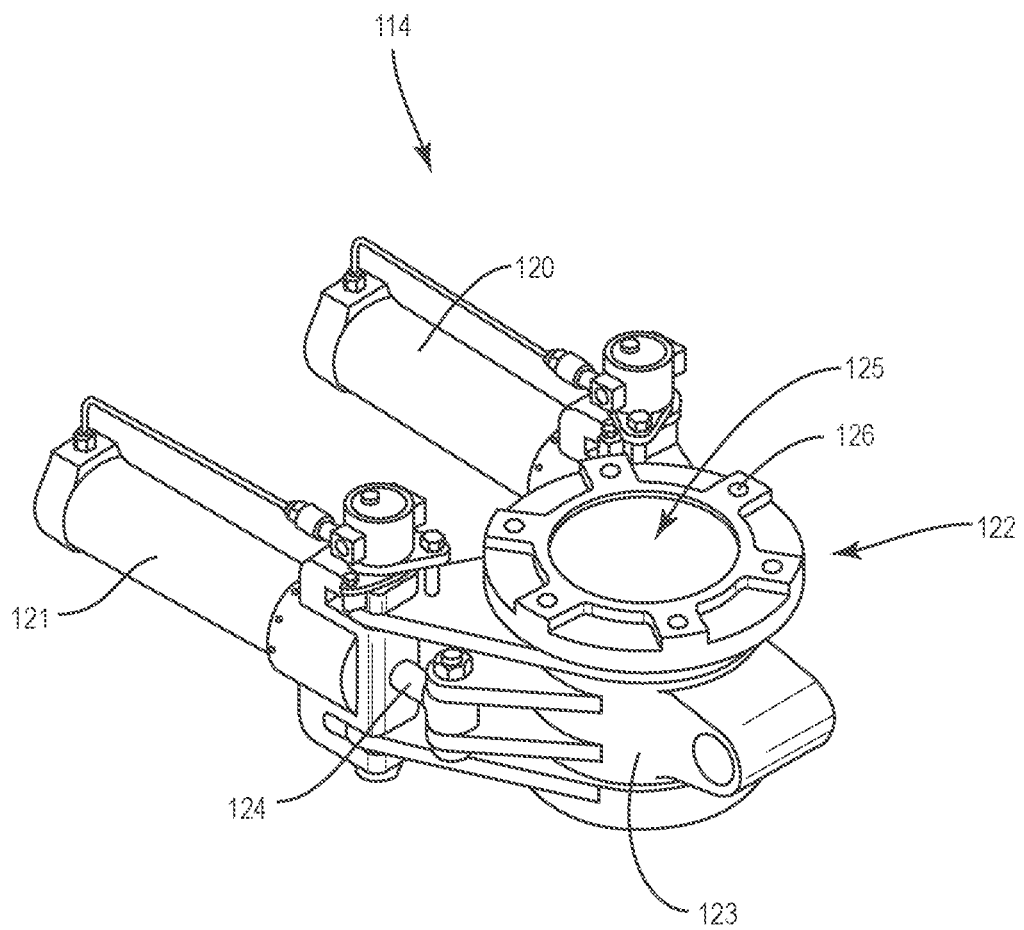
FIG. 3 perspective view of a steering mechanism of a nose landing gear.

FIG. 3 illustrates the steering mechanism 114 mounted to a housing 122 of the nose landing gear 104 and with the shock absorber 110 removed for clarity. The steering mechanism 114 includes a first hydraulic cylinder 120 and arm (not illustrated) and a second hydraulic cylinder 121 and arm 124. The arms 124 extend from the cylinders 120, 121 respectively and connect to a sleeve 123. The sleeve 123 is operatively connected to the lower strut 111 and rotates relative to the housing 122 with the rotation of the lower strut 111 and wheels 113.

The hydraulic cylinders 120, 121 are mounted to the housing 122 with the arms 124 connected to opposing sides of the sleeve 123. During use, powering of the hydraulic cylinders 120, 121 causes the arms 124 to extend and retract to rotate the sleeve 123 and the attached inner strut 111 and wheels 113. The steering mechanism 114 is operated based on commands received by flight crew in the flight deck.

Figure 4:
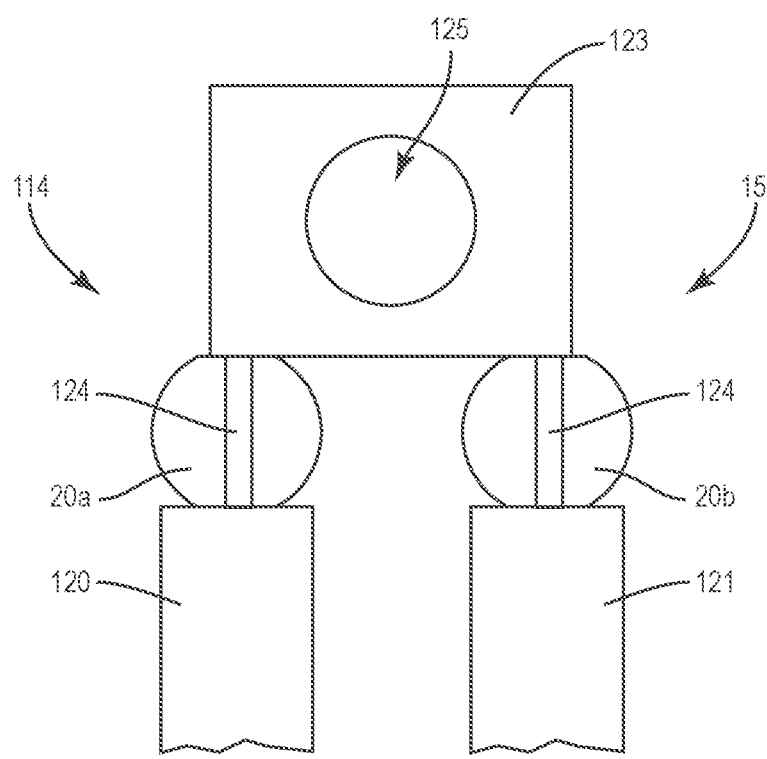
FIG. 4 is a schematic diagram of a chock to engage with a steering mechanism of a nose landing gear of an aircraft to limit steering rotation of the nose landing gear.

The present application includes a device 15 configured to be mounted to the steering mechanism 114 to limit steering rotation of the nose landing gear 105. FIG. 4 illustrates a generic example of a device 15 that limits the rotation of the steering mechanism 114. The device 15 is shaped and sized to engage with the steering mechanism 114 and prevent and/or limit rotation of the sleeve 123 of the steering mechanism 114. In some examples as illustrated in FIG. 4, the device 15 includes multiple chocks 20a, 20b that engage with the steering mechanism 114. In other examples, the device 15 is a single chock 20 that engages with the steering mechanism 114.

The device 15 limits the steering rotation of the nose landing gear 105 including the lower strut 111 and wheels 113. In some examples, the device 15 prevents rotation and causes the nose landing gear 105 to remain in a fixed position. In one specific example, the device 15 positions the lower strut 111 and wheels 113 at a 0° steering angle in which they are aligned directly forward. In some examples, the device 15 limits the movement of the steering mechanism 114 to within a rotational range. This can include a home position (e.g., 0° steering angle) and angular amounts in both directions relative to the home position. The range can vary with examples including but not limited to a 10°

Gsteering angle range (i.e., home position of 0° steering angle and a steering angle range of between −5° to 5°), and a steering angle range of 20° (i.e., home position of 0° steering angle and a steering angle range of between −10° to 10°).

The one or more chocks are constructed from a material that is softer than the nose landing gear 105. This prevents the chocks 20 from causing damage to the steering mechanism 114. Examples of materials include but are not limited to nylon, delrin, polyoxymethylene, and aluminum. In some examples, the chocks 20 deform during movement of the steering mechanism 114. In other examples, the chocks 20 do not deform during the movement.

Figure 5:
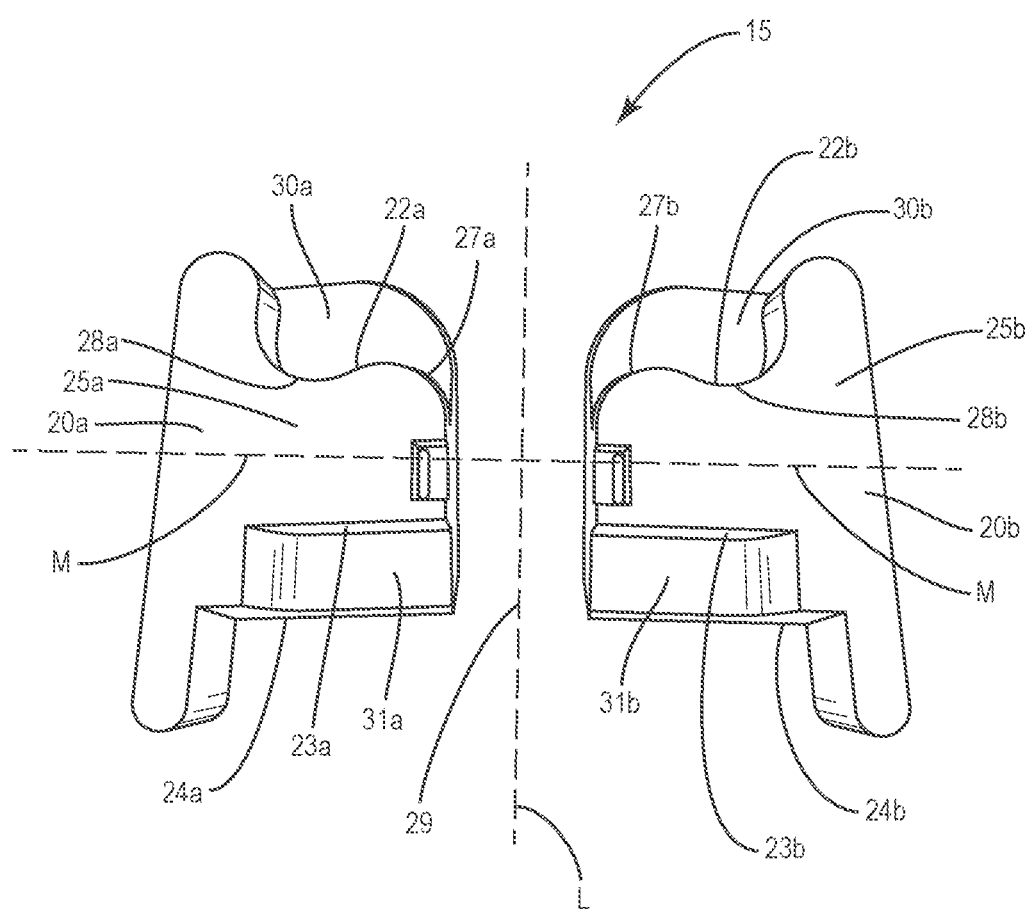
FIG. 5 is a perspective view of a chock that includes a first member and a second member.

FIG. 5 illustrates a device 15 that includes a first chock 20a and a second chock 20b. The two chocks 20a, 20b are separate with the first chock 20a configured to engage with the first cylinder 120 and arm 124 and the second chock 20b configured to engage with the second cylinder 120 and arm 124. In some examples as illustrated in FIG. 5, the two chocks 20a, 20b are mirror images of each other relative to a straight line L that extends through an intermediate gap 29.

The chocks 20a, 20b include a front contact side 22a, 22b. The front contact sides 22a, 22b include a curved shape with a corner 28a, 28b that extends into the chock towards a midline M a greater distance than a medial section 27a, 27b along the front contact side 22a, 22b. The deeper corner 28 provides for the chock 20a, 20b to remain engaged with the steering mechanism 114 when a force is exerted on the chock 20a, 20b. A thin floor section 30a, 30b extends forward from the front contact side 22a, 22b. The floor section 30a, 30b includes a smaller thickness than the chock 20a, 22 along the front contact side 22a, 22b. The chocks 20a, 20b also include a back contact side 23a, 23b that opposes the front contact side 22a, 22b. A thin floor section 31a, 31b extends outward from the back contact side 23a, 23b.

The chocks 20a, 20b include a bottom side 24a, 24b. In some examples, the bottom side 24a, 24b is flat with other examples having other shapes. The chocks 20a, 20b also include a top side 25a, 25b. The chocks 20a, 20b include a height measured between the opposing bottom and top sides 24a, 24b, 25a, 25b.

Figure 6:
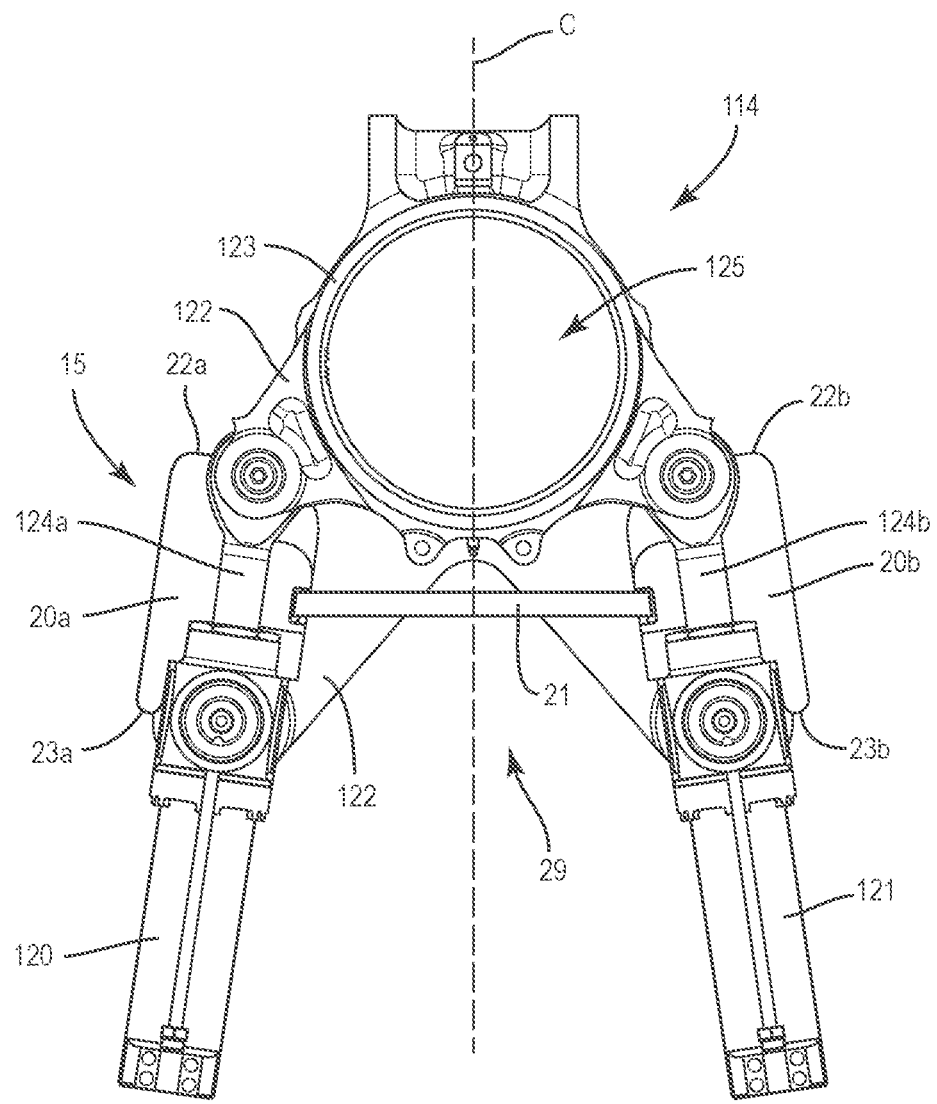
FIG. 6 is a top view of a chock engaged with a steering mechanism of a nose landing gear.
Figure 7:
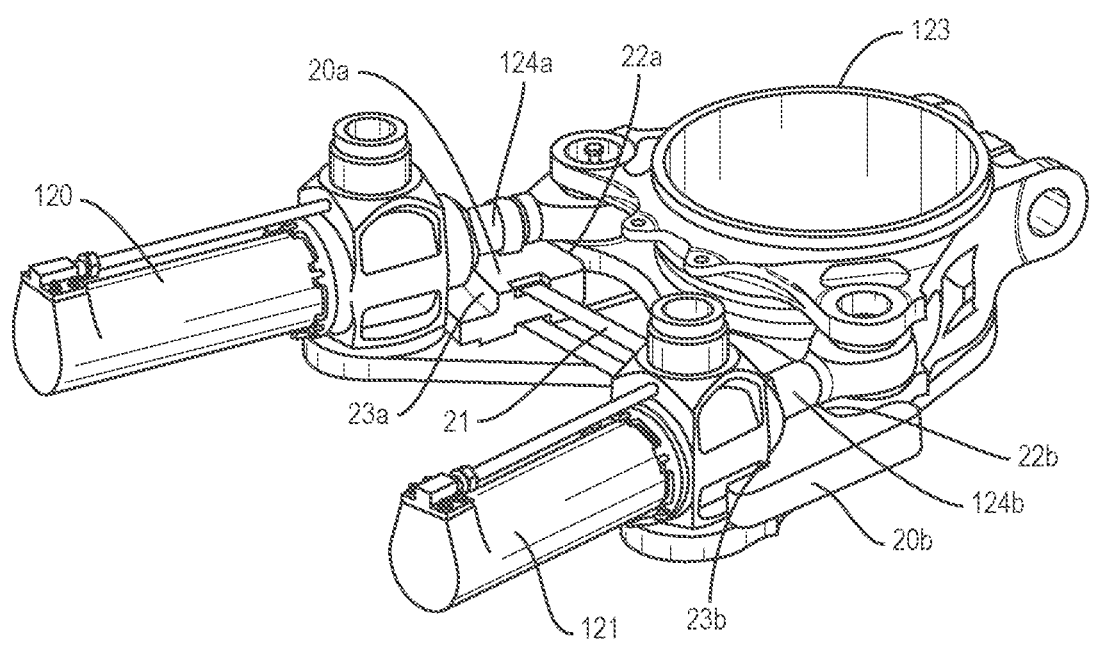
FIG. 7 is a perspective view of the chock of FIG. 6.

FIGS. 6 and 7 illustrate the device 15 engaged with the steering mechanism 114. The first chock 20a is positioned between the cylinder 120 and housing 122. The second chock 20b is positioned between the cylinder 121 and the housing 122. In some examples, the chocks 20a, 20b are positioned with the bottom sides 24a 24b contacting against a plate of the housing 122. The height provides for the chocks 20a, 20b to fit underneath the arms 124a, 124b. The forward floor sections 30a, 30b are positioned underneath the forward sections of the arms 124a, 124b and the housing 122. The rearward floor sections 31a, 31b are positioned underneath the rearward sections of the arms 124a, 124 and the leading sections of the cylinders 120, 121.

A connector 21 connects together the two chocks 20a, 20b. The connector 21 includes a length that spans across the gap 29 between the two chocks 20a, 20b without interfering with the function of limiting steering rotation of the nose landing gear 105. In some examples, the connector 21 is a flexible member such as but not limited to a cord, rope, and cable. In some examples, the connector 21 is attached to the nose landing gear 105 to assist with maintaining the engagement of the device 15. In some examples with multiple chocks 20, the individual chocks 20 are not connected (i.e., there is not a connector 21).

In some examples, the device 15 prevents steering rotation of the nose landing gear 105. As illustrated in FIG. 6, a centerline C extends through the sleeve 123 and opening 125. The device 15 prevents rotation of the sleeve 123 relative to the housing 122. In some examples, this locks the nose landing gear 105 in a forward position with a 0° steering angle in which the wheels 113 are aligned for steering the aircraft 100 directly forward.

Figure 8C:
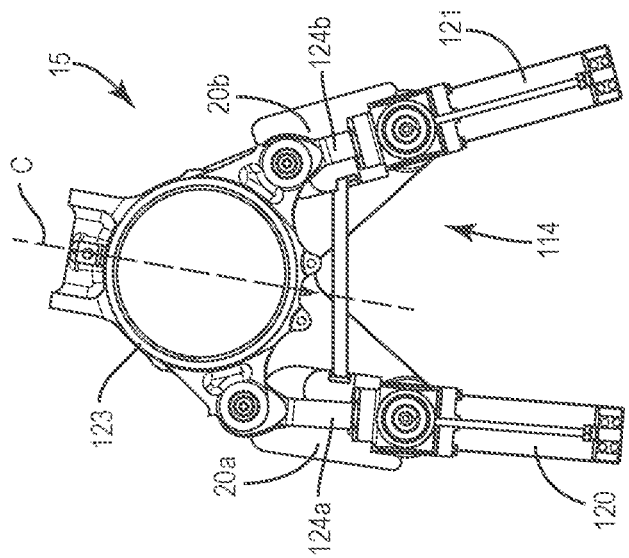
FIG. 8C is a top view of the chock of FIG. 8A in a third angular steering position.
Figure 8B:
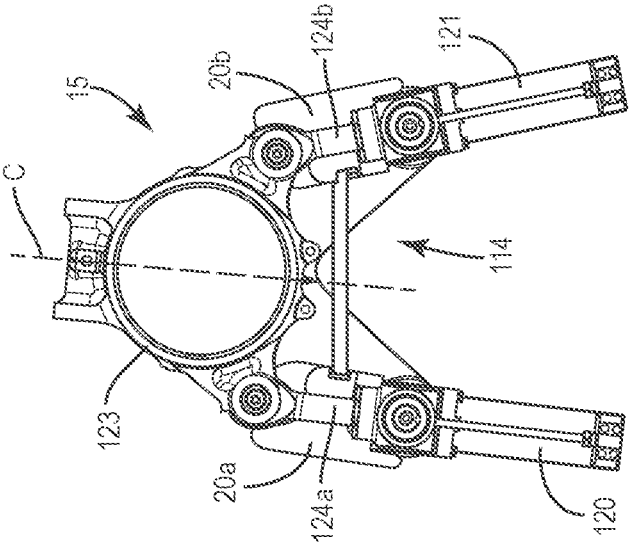
FIG. 8B is a top view of the chock of FIG. 8A in a second angular steering position.
Figure 8A:
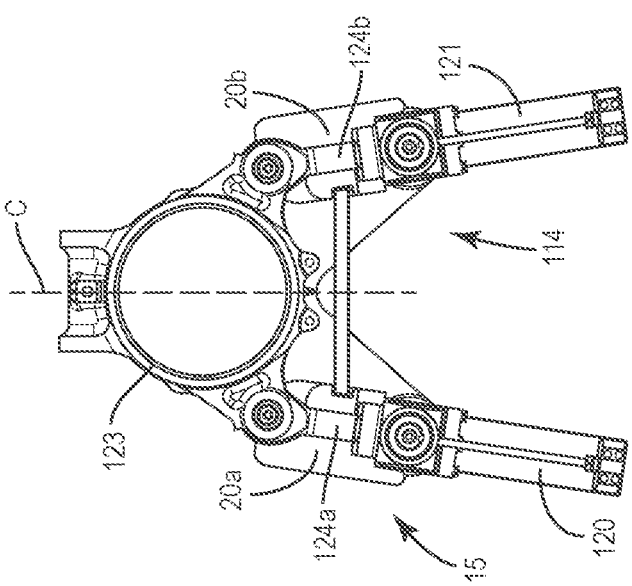
FIG. 8A is a top view of a chock engaged with a steering mechanism of a nose landing gear that is at a first angular steering position.

FIGS. 8A, 8B, and 8C illustrate a device 15 engaged with a steering mechanism 114 of a nose landing gear 105. In this example, the device 15 provides for movement of the steering mechanism 114. FIG. 8A illustrates the steering mechanism 114 with a 0° steering angle with the centerline C extending an equal distance between the two cylinders 120, 121. FIG. 8B illustrates the sleeve 123 at an offset steering angle of 5°. The rotation of the sleeve 123 causes the chock 20b to be compressed between the sleeve 123 and the cylinder 121. The chock 20a is not compressed with one or both of the front contact side 22a and back contact side 23a being spaced away from the respective sleeve 123 and/or cylinder 120. FIG. 8C illustrates further rotation of the sleeve 123 to a steering angle of 9.5°. This additional rotation causes additional compression of the chock 20b.

As illustrated in FIGS. 8A, 8B, and 8C, rotation of the steering mechanism 114 in a first direction (i.e., to the right as illustrated) causes chock 20b to compress as the arm 124b is retracted into the cylinder 121. Concurrently, chock 20a does not compress because the arm 124a is extended outward from the cylinder 120. Rotation of the steering mechanism 114 in the opposing second direction (i.e., to the left as illustrated) causes compression of the chock 20a due to retraction of the arm 124a. This further causes elongation of the arm 124b and thus chock 20b does not compress. In some examples, the range of rotation is the same in both directions. In other examples, the rotation is uneven with additional rotation being allowed in one direction.

In some examples, the chocks 20a, 20b are shaped and sized to fit within the space between the cylinder 120, 121 and housing 122 respectively without being compressed when the steering mechanism 114 is at a base position (i.e., 0° steering angle). The chocks 20a, 20b do not compress until rotation of the steering mechanism 114 to a predetermined amount (e.g., no compression until a 5°/−5° steering angle). In some examples, the chocks 20a, 20b are compressed to fit within the respective spaces at the 0° steering angle.

In some examples, the shape of the chocks 20a, 20b assists in maintaining the position between the sleeve 123 and cylinders 120, 121. The deep corners 28a, 28b recessed below the medial section 27a, 27b along the front contact sides 22a, 22b provide for the chocks 20a, 20b to maintain engagement during movement of the steering mechanism 114. In some examples, the back contact sides 23a, 23b include a similar curved shape to maintain the engagement.

Figure 9:
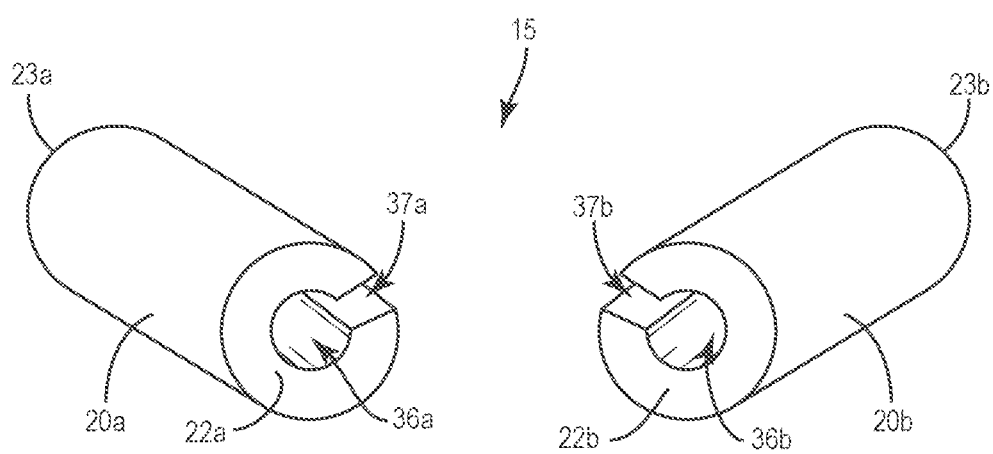
FIG. 9 is a perspective view of a chock that includes a first member and a second member.

In some examples, the one or more chocks 20a, 20b are configured to connect to the arms 124. FIG. 9 illustrates an example with chock 20a configured to engage a first arm 124a and chock 20b configured to engage a second arm 124b. The chocks 20a, 20b include a C-shaped body with a front contact side 22a, 22b and opposing back contact side 23a, 23b. A slot 36a, 36b extends through the chocks 20a, 20b and is sized to receive the arm 124a, 124b. An opening 37a, 37b leads into the slot 36a, 36b to provide for the chock 20a, 20b to slip onto the arm 124a, 124b from the side during installation.

Figure 10:
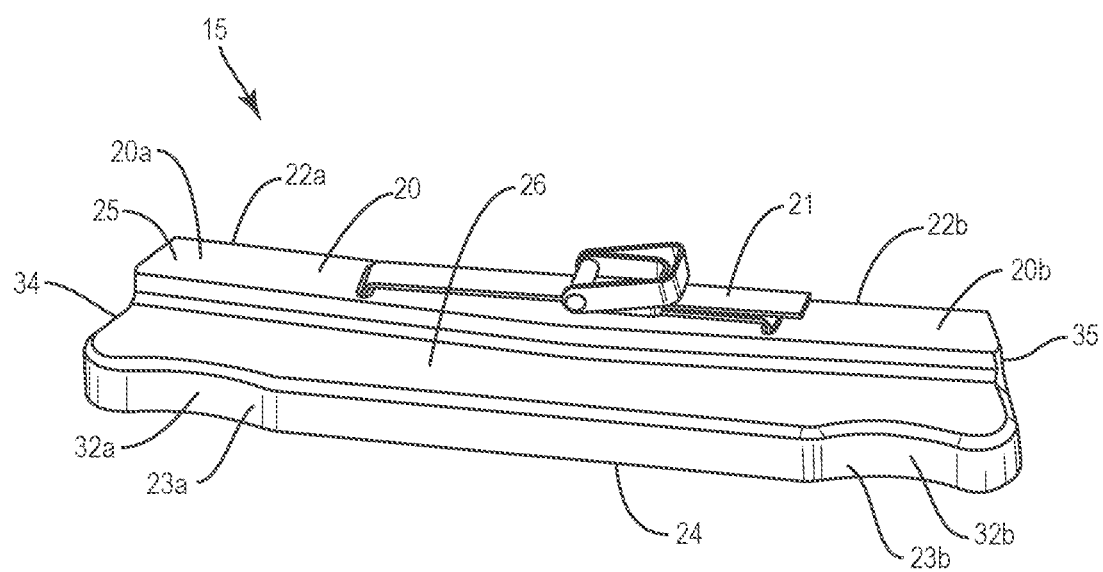
FIG. 10 is a perspective view of a chock having a single unitary construction.

In some examples, the device 15 includes a single unitary construction. FIG. 10 illustrates a device 15 with a single member that includes both the first chock 20*a* and the second chock 20*b*. The single member includes front contact sides 22*a*, 22*b* and an opposing back contact sides 23*a*, 23*b*. The back contact sides 23*a*, 23*b* includes indentations 32*a*, 32*b* to engage with the cylinders 120, 121 respectively. The member 20 includes a length measured between the lateral sides 34, 35 to engage with both cylinders 120, 121. The member has an intermediate section 26 that spans between the chocks 20*a*, 20*b*. The intermediate section 26 is sized to span across the gap 29. A connector 21 is positioned to wrap around a portion of the steering mechanism 114 to maintain the chocks 20*a*, 20*b* in position. In some examples, the member includes a mirrored shaped relative to a straight line that extends through the chock halfway between the lateral sides such that each of the chocks 20*a*, 20*b* includes the same shape and size.

Figure 11A:
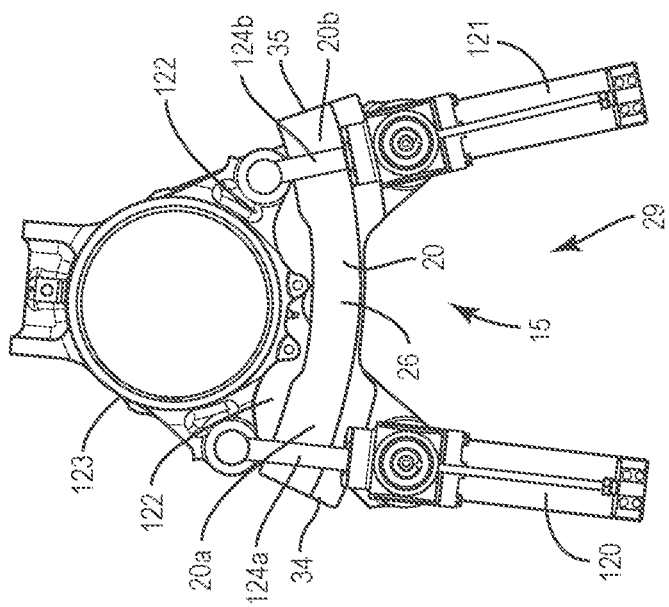
FIG. 11A is a top view of a chock engaged with a steering mechanism of a nose landing gear that is at a first angular steering position.
Figure 11B:
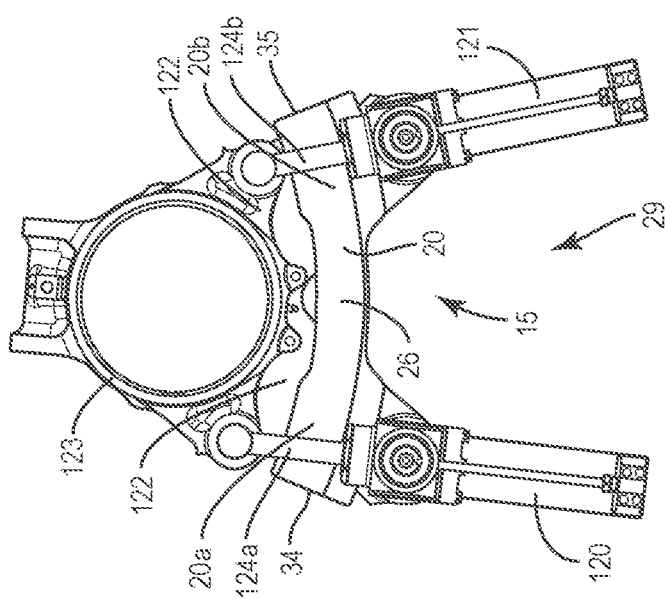
FIG. 11B is a top view of the chock of FIG. 11A in a second angular steering position.
Figure 12:
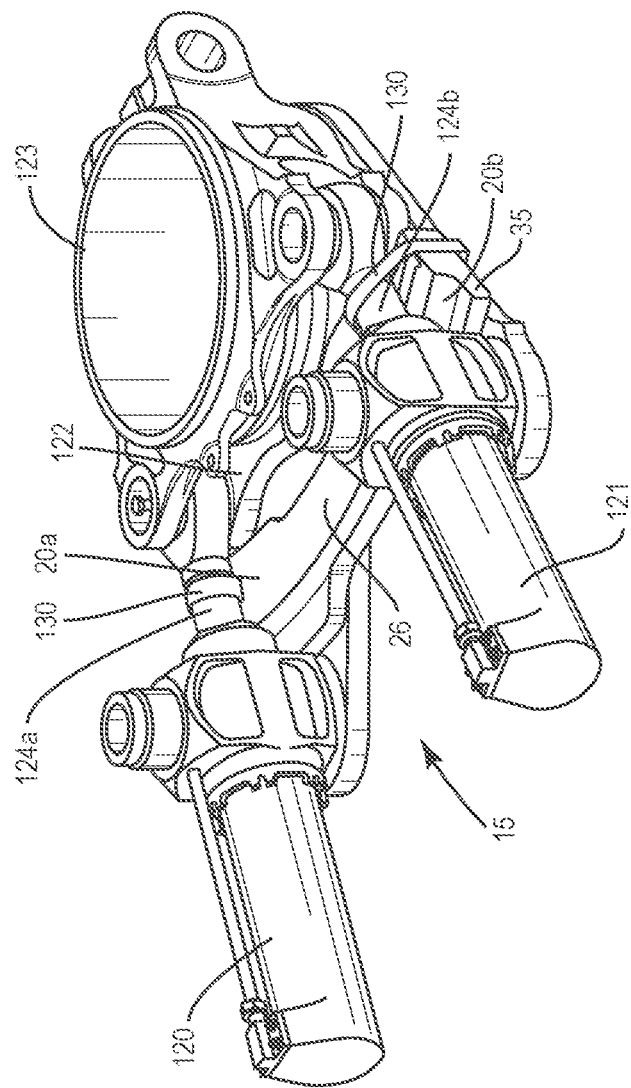
FIG. 12 is a perspective view of a chock engaged with a steering mechanism of a nose landing gear.

FIGS. 11A, 11B, and 12 illustrate an example in which the chocks 20*a*, 20*b* are constructed from a single, unitary member. The member has a length measured between opposing lateral sides 34, 35 for the chocks 20*a*, 20*b* to fit between each of the cylinders 120, 121 and the sleeve 123. The elongated body further spans across the gap 29 formed between the cylinders 120, 121. In some examples, during rotation of the steering mechanism 114 just a limited portion of the member deforms with the remainder maintaining the same shape. In one specific example, chock 20*a* deforms while chock 20*b* remains in the same shape. In one example, the intermediate section 26 does not deform during deformation of the chocks 20*a*, 20*b*.

The one or more chocks 20*a*, 20*b* can be held in position at the steering mechanism 114 in various manners. The connector 21 can attach to the steering mechanism 114 to maintain the positioning. In some examples as illustrated in FIG. 12, fasteners 130 engage with the chocks 20*a*, 20*b* device 15 and steering mechanism 114 to maintain the positioning. The fasteners 130 can have various shapes and/or sizes.

Figure 13:
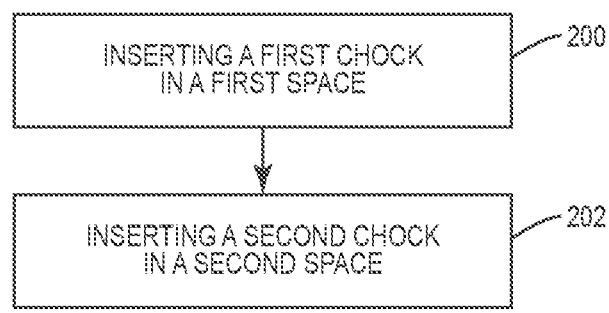
FIG. 13 is a flowchart diagram of a method of limiting steering rotation of a nose landing gear of an aircraft.

FIG. 13 illustrates a method of using the device 15 to limit steering rotation of a nose landing gear 105 of an aircraft 100. The method includes inserting a first chock 20*a* in a first space formed between the first cylinder 120 and the nose landing gear 105 (block 200). A second chock 20*b* is inserted into a second space formed between the second cylinder 121 and the nose landing gear 105 (block 202).

In the example of FIG. 13, the chocks 20*a*, 20*b* limit the amount of steering rotation. In some examples, this occurs because the first chock 20*a* is configured to compress and limit the steering rotation of the nose landing gear 105 in a first direction. The second chock 20*b* is configured to compress and limit the steering rotation of the nose landing gear 105 in the second direction.

In some examples, the steering mechanism 114 is hydraulically powered by hydraulic cylinders 120, 121 that control the movement of the arms 124 and thus the rotation of the nose landing gear 105. In other examples, the steering mechanism 114 is electrically powered. Extension arms that are extendable and retractable are electrically powered to control the rotation of the nose landing gear 105. In a similar manner, the one or more chocks 20*a*, 20*b* are configured to engage with the extension arms to compress to prevent retraction of the extension arms and thus control rotation of the nose landing gear 105.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A device to engage with a steering mechanism of a nose landing gear of an aircraft to limit steering rotation of the nose landing gear, the device comprising:
   a first chock sized to fit within a first space formed in the nose landing gear at a first cylinder of a steering mechanism of the nose landing gear;
   a second chock sized to fit within a second space formed in the nose landing gear at a second cylinder of the steering mechanism;
   wherein the first chock is configured to engage with the first cylinder and to compress to prevent retraction of the first cylinder beyond a first predetermined length; and
   wherein the second chock is configured to engage with the second cylinder and to compress to prevent retraction of the second cylinder beyond a second predetermined length.

2. The device of claim 1, wherein the first chock and the second chock are separate members that configured to be spaced apart by a gap when engaged respectively with the first cylinder and the second cylinder.

3. The device of claim 2, further comprising an elongated flexible connector with a first end connected to the first chock and a second end connected to the second chock.

4. The device of claim 2, wherein the first chock and the second chock comprise mirrored shapes.

5. The device of claim 1, wherein the first chock and the second chock comprise a single, unitary member with the member comprising an intermediate section sized to extend across a gap formed between the first cylinder and the second cylinder.

6. A device to engage with a steering mechanism of a nose landing gear of an aircraft to limit steering rotation of the nose landing gear, the device comprising:
   a first chock sized to fit within a first space at a first section of a steering mechanism of the nose landing gear;
   a second chock sized to fit within a second space at a second section of the steering mechanism of the nose landing gear;
   the first chock and the second chock each comprising:
      a front contact side;
      a back contact side that opposes the front contact side;
      a bottom side;
      a top side that opposes the bottom side;
   wherein the first chock is sized to fit within the first space and to compress when the steering mechanism turns the nose landing gear in a first direction; and
   wherein the second chock is sized to fit within the second space and to compress when the steering mechanism turns the nose landing gear in a second direction.

7. The device of claim 6, wherein the first chock and the second chock are separate members.

8. The device of claim 7, further comprising an elongated flexible connector with a first end connected to the first chock and a second end connected to the second chock.

9. The device of claim 8, wherein the first chock and the second chock comprise a single, unitary member with the member comprising an intermediate section sized to extend across a gap formed between the first section and the second section of the steering mechanism.

10. The device of claim 6, wherein the first chock comprises a central slot that extends through the first chock between the front contact side and the back contact side, the first chock further comprising an opening that extends into the central slot along a lateral side of the first chock.

11. A method of limiting steering rotation of a nose landing gear of an aircraft, the method comprising:
- inserting a first chock in a first space formed between a first cylinder and the nose landing gear;
- inserting a second chock in a second space formed between a second cylinder and the nose landing gear;
- wherein the first chock is configured to compress and limit steering rotation of the nose landing gear in a first direction; and
- wherein the second chock is configured to compress and limit the steering rotation of the nose landing gear in a second direction.

12. The method of claim 11, further comprising:
- turning the nose landing gear in the first direction and compressing the first chock and limiting the steering rotation of the nose landing gear in the first direction; and
- turning the nose landing gear in the second direction and compressing the second chock and limiting the steering rotation of the nose landing gear in the second direction.

13. The method of claim 12, further comprising maintaining the first chock connected with a connector to the second chock while turning the nose landing gear in the first direction and the second direction.

14. The method of claim 12, further comprising turning the nose landing gear in the first direction and increasing a size of the second space while concurrently compressing the first chock.

15. The method of claim 12, further comprising inserting the first chock underneath a first arm that extends outward from the first cylinder and inserting the second chock underneath a second arm that extends outward from the second cylinder.

16. The method of claim 12, further comprising:
- in response to turning the nose landing gear in the first direction, compressing the first chock and preventing a steering angle of the nose landing gear from turning beyond a first predetermined amount in the first direction; and
- in response to turning the nose landing gear in the second direction, compressing the second chock and preventing the steering angle of the nose landing gear from turning beyond a second predetermined amount in the second direction.

17. The method of claim 11, further comprising attaching the first chock to a first arm that extends outward from the first cylinder and attaching the second chock to a second arm that extends outward from the second cylinder.

18. The method of claim 12, further comprising spacing the first chock away from the second chock.

19. The method of claim 12, further comprising the first chock and the second chock being a single unitary member and compressing the first chock when turning the nose landing gear in the first direction without compressing an intermediate section that extends between the first chock and the second chock and turning the nose landing gear in the second direction without compressing the intermediate section.

20. The method of claim 12, further comprising inserting the first chock in the first space and the second chock in the second space when the nose landing gear is at a 0 steering angle.

* * * * *